US012565189B2

(12) United States Patent
Kaita et al.

(10) Patent No.: US 12,565,189 B2
(45) Date of Patent: Mar. 3, 2026

(54) VEHICLE

(71) Applicant: TOYOTA JIDOSHA KABUSHIKI KAISHA, Toyota (JP)

(72) Inventors: Keiji Kaita, Miyoshi (JP); Takahiko Hirasawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 18/740,074

(22) Filed: Jun. 11, 2024

(65) Prior Publication Data

US 2025/0018925 A1 Jan. 16, 2025

(30) Foreign Application Priority Data

Jul. 13, 2023 (JP) ................................. 2023-115002

(51) Int. Cl.
B60W 20/16 (2016.01)
B60W 50/14 (2020.01)

(52) U.S. Cl.
CPC ............ B60W 20/16 (2016.01); B60W 50/14 (2013.01); B60W 2050/146 (2013.01); B60W 2510/244 (2013.01); B60W 2530/209 (2020.02); B60W 2540/106 (2013.01)

(58) Field of Classification Search
CPC ...... B60W 10/08; B60W 10/06; B60W 20/16; B60W 2050/146; B60W 2510/244; B60W 2530/209; B60W 2540/10; B60W 2540/106; B60W 50/14
See application file for complete search history.

(56) References Cited

U.S. PATENT DOCUMENTS

| | | | | |
|---|---|---|---|---|
| 12,441,295 B2 * | 10/2025 | Polonowski | .......... | B60W 10/04 |
| 2022/0292951 A1 | 9/2022 | Kinomura | | |
| 2023/0150502 A1 * | 5/2023 | Dickson | ................ | B60W 50/14 |
| | | | | 701/95 |

FOREIGN PATENT DOCUMENTS

JP 2022-141045 A 9/2022

* cited by examiner

*Primary Examiner* — Wade Miles
*Assistant Examiner* — Zachary Joseph Wallace
(74) *Attorney, Agent, or Firm* — Finnegan, Henderson, Farabow, Garrett, and Dunner, LLP

(57) ABSTRACT

Vehicles include a battery, a MG, and an ECU. The battery stores electric power as an energy source of the vehicle. MG generates the driving force of the vehicles by consuming power. ECU controls MG. Battery power includes green power and non-green power, each classified according to the greenhouse gas emission intensity. The emission intensity of green power is smaller than that of non-green power. ECU controls MG so as to limit the driving force in a case where the amount of green power in the electric power of the battery is small than the driving force in a case where the amount of green power in the electric power of the battery is large.

4 Claims, 5 Drawing Sheets

GREEN POWER RATIO:    0 [%]         $\dfrac{e1}{QE} \times 100$ [%]

FIG. 4

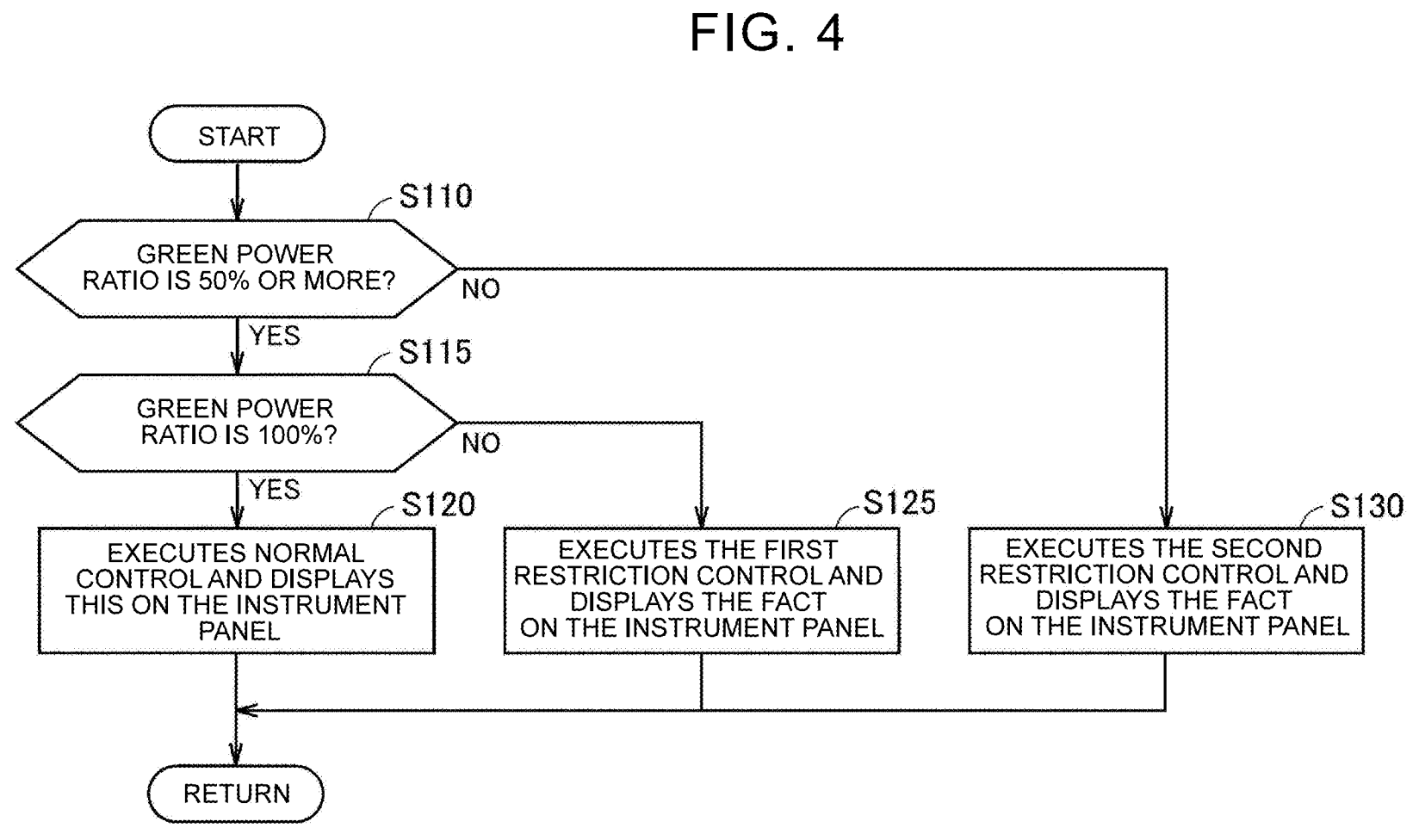

START

S110 — GREEN POWER RATIO IS 50% OR MORE?

NO → S130 — EXECUTES THE SECOND RESTRICTION CONTROL AND DISPLAYS THE FACT ON THE INSTRUMENT PANEL

YES

S115 — GREEN POWER RATIO IS 100%?

NO → S125 — EXECUTES THE FIRST RESTRICTION CONTROL AND DISPLAYS THE FACT ON THE INSTRUMENT PANEL

YES

S120 — EXECUTES NORMAL CONTROL AND DISPLAYS THIS ON THE INSTRUMENT PANEL

RETURN

VEHICLE

CROSS-REFERENCE TO RELATED APPLICATION

This application claims priority to Japanese Patent Application No. 2023-115002 filed on Jul. 13, 2023, incorporated herein by reference in its entirety.

BACKGROUND

1. Technical Field

The present disclosure relates to a vehicle.

2. Description of Related Art

In Japanese Unexamined Patent Application Publication No. 2022-141045 (JP 2022-141045 A), a power management system is disclosed. The power management system includes a vehicle and a server. The vehicle includes a battery. The server manages electric energy stored in the battery in association with CO2 emission intensity. The server quantitatively evaluates how much of the electric energy of green power is included in the electric energy stored in the battery and how much of the electric energy of non-green power is included in the electric energy stored in the battery.

SUMMARY

From the viewpoint of reducing greenhouse gases such as carbon dioxide, there is a demand for a technique for effectively prompting a user to use environmentally friendly green energy as an energy source of a vehicle.

The present disclosure has been made to solve the above issue, and an object the present disclosure is to provide a vehicle capable of effectively prompting a user to use an energy source that is friendly to the environment.

A vehicle of the present disclosure includes an energy source storage device, a drive device, and a control device. The energy source storage device stores an energy source of the vehicle. The drive device generates a driving force of the vehicle by consuming the energy source. The control device controls the drive device. The energy source includes a first energy source and a second energy source, each of the first energy source and the second energy source being classified in accordance with an emission intensity of a greenhouse gas. The emission intensity of the first energy source is smaller than the emission intensity of the second energy source. The control device controls the drive device such that the driving force when an amount of the first energy source in the energy source is small, is more limited than the driving force when the amount of the first energy source in the energy source is large.

According to the present disclosure, it is possible to effectively prompt the user of the vehicle to use an environmentally friendly energy source as an energy source of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flow chart illustrating a process executed by Electronic Control Unit (ECU) in the first Embodiment;

DETAILED DESCRIPTION OF EMBODIMENTS

Figure 1A:
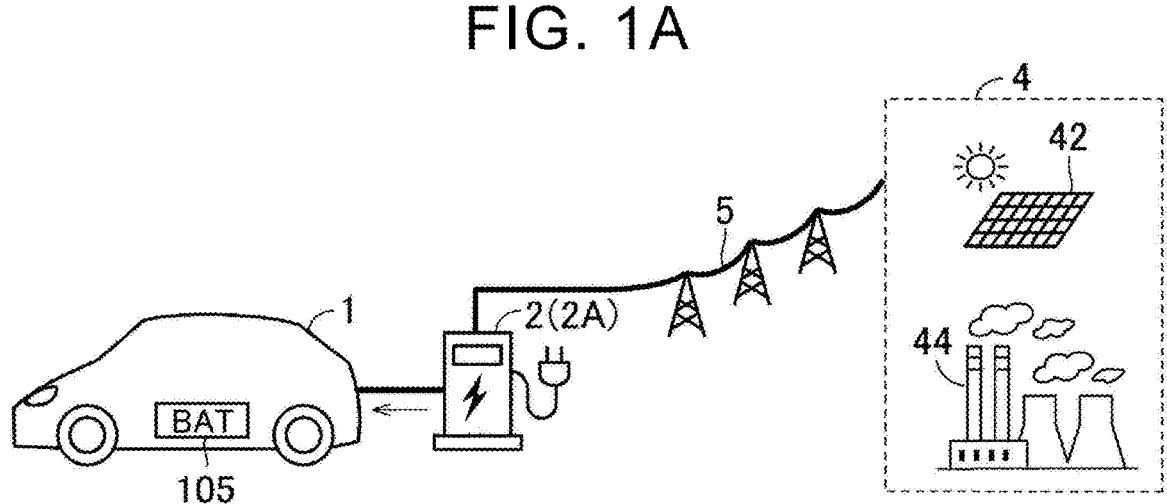
FIG. 1A is a diagram illustrating a power system including a vehicle according to a first embodiment.

Hereinafter, embodiments of the present disclosure will be described in detail with reference to the drawings. The same or corresponding parts in the drawings are denoted by the same reference numerals, and the description thereof will not be repeated. Each of the embodiments and the modification examples thereof may be combined with each other as appropriate.

First Embodiment

Figure 1B:
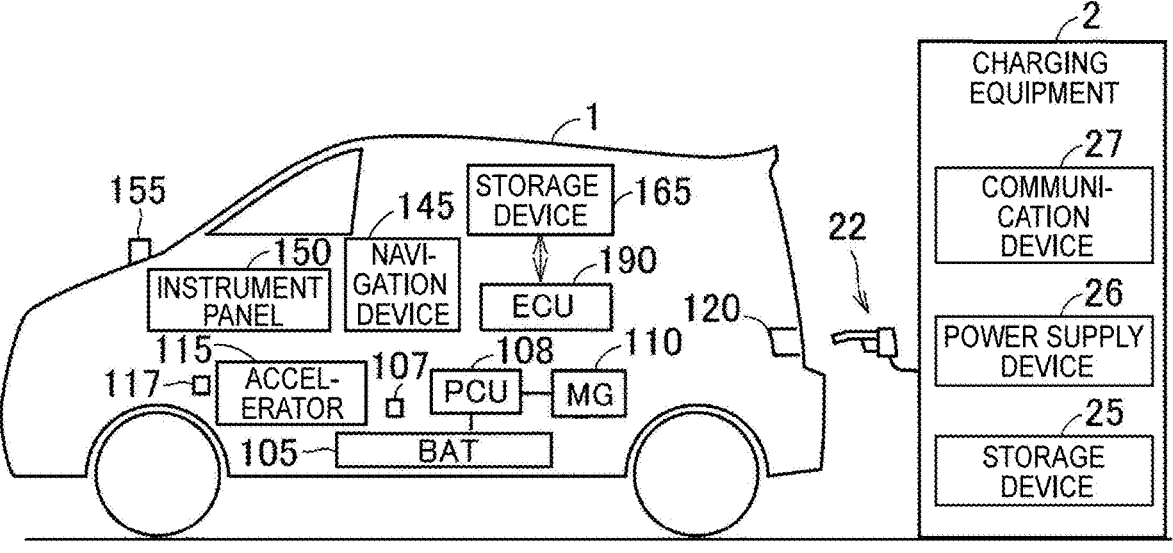
FIG. 1B is a diagram illustrating a power system including a vehicle according to a first embodiment.

FIG. 1A and FIG. 1B are diagrams illustrating a power system including a vehicle according to a first embodiment. This vehicle is Battery Electric Vehicle (BEV). That is, the energy source of the vehicle is electric power.

Referring to FIG. 1A, in this embodiment, external charging of the vehicle 1 is performed. The external charging is to charge the battery 105 of the vehicle 1 by using the electric power supplied from the charging facility 2 to the vehicle 1. The charging facility 2 is provided outside the vehicle 1. The charging facility 2 receives the electric power generated by the power generation facility 4 via the power transmission line 5, and supplies the electric power to the vehicle 1.

The power generation facility 4 includes a photovoltaic power generation facility 42 and a thermal power generation facility 44. The power generated by the power generation facility 4 is classified into either green power or power different from green power (hereinafter, also referred to as "non-green power"). The green power corresponds to power derived from renewable energy, and in this example corresponds to the power generated by the photovoltaic power generation facility 42. Green power may also be referred to as "clean power." The non-green power corresponds to power that is not derived from renewable energy, and in this example corresponds to the generated power of the thermal power generation facility 44.

Referring to FIG. 1B, the vehicle 1 includes a battery 105, a sensor unit 107, a Power Control Unit (PCU) 108, a Motor Generator (MG) 110, an accelerator pedal 115, an opening degree sensor 117, and an inlet 120. The vehicle 1 further includes a car navigation device 145, an instrument panel 150, a display lamp 155, a storage device 165, and an ECU 190.

The battery 105 is an example of a power storage device for traveling and stores electric power as an energy source of the vehicle 1. The battery 105 corresponds to an example of an "energy source storage device" of the present disclosure. The electric power stored in the battery 105 includes at least one of green power and non-green power. The storage amount of the battery 105 is also referred to as a "total storage amount". Among the total storage amounts, the storage amount of green power is also referred to as a "first storage amount", and the storage amount of non-green power is also referred to as a "second storage amount". The sum of the first storage amount and the second storage amount corresponds to the total storage amount. The ratio of the first storage amount to the total storage amount is also referred to as a "green power ratio".

The sensor unit 107 measures the voltage and current of the battery 105. During charging and discharging of the battery 105, current measurements are positive and negative, respectively. PCU 108 receives the discharged power of the battery 105 as an inputted power, converts the discharged power into AC power, and supplies the AC power to MG 110 as an outputted power.

MG 110 generates the driving force of the vehicle 1 by consuming the power of the battery 105 (specifically, receiving the AC power from PCU 108). The smaller the driving force, the lower the power consumption of the battery 105. The driving force corresponds to the power of MG 110 determined based on the torque and the rotational speed of MG 110. MG 110 corresponds to an exemplary "drive device" of the present disclosure. MG 110 can also perform regenerative power generation at the time of braking of the vehicle 1 or at the time of reducing accelerations on the downstream slope. At the time of regenerative power generation of MG 110, the generated electric power (regenerative electric power) is supplied to the battery 105 through PCU 108, and the battery 105 is charged.

The accelerator pedal 115 is operated by a user of the vehicle 1. That is, the opening degree of the accelerator pedal 115 is adjusted in accordance with a user operation. The opening degree sensor 117 measures an opening degree of the accelerator pedal 115. The measured value of the opening degree sensor 117 is also referred to as "actual accelerator operation amount".

The inlet 120 can receive power supplied from the charging facility 2 when the charging gun 22 (described later) of the charging facility 2 is inserted and the vehicle 1 is connected to the charging facility 2. The power received by the inlet 120 is supplied to the battery 105.

The car navigation device 145 displays a screen for car navigation on the display. The instrument panel 150 displays various state values of the vehicle 1, such as measured values of various meters of the vehicle 1. The status value includes a State Of Charge (SOC of the battery 105) and a value representing the vehicle speed of the vehicle 1. The display lamp 155 is provided outside the vehicle cabin of the vehicle 1, and is configured to be capable of switching between a plurality of lighting colors. Each of the car navigation device 145, the instrument panel 150, and the display lamp 155 corresponds to an example of a "notification device" of the present disclosure.

The storage device 165 stores various data and maps. The data includes storage amount management data for managing the storage amount of the battery 105. This data includes information indicating the total amount of stored electricity, information indicating the first amount of stored electricity, information indicating the second amount of stored electricity, and information indicating the green power ratio. The map is used to control the driving force of the vehicle 1. A specific example of the map will be described later in detail.

ECU 190 controls various devices of the vehicle 1 in accordance with the map stored in the storage device 165 and the measured values of various sensors such as the sensor unit 107 and the opening degree sensor 117. The device includes a MG 110 (PCU 108), a car navigation device 145, an instrument panel 150, and a display lamp 155. ECU 190 drives and controls MG 110 using PCU 108. Driving and controlling MG 110 is also referred to as "executing motor drive control".

ECU 190 sets a control accelerator operation amount (described later) based on the actual accelerator operation amount. ECU 190 controls the driving force of the vehicle 1 in accordance with the setting result and the vehicle speed. ECU 190 calculates SOC based on the measured value of the sensor unit 107, thereby determining the total storage amount, and sequentially stores the determination result in the storage device 165.

While the vehicle 1 is connected to the charging facility 2, ECU 190 is configured to communicate with the charging facility 2 by, for example, Controller Area Network (CAN) communication. At the time of external charging, ECU 190 receives, from the charging facility 2, information indicating the amount of the supplied power and whether the supplied power is classified as green power or non-green power. In this way, ECU 190 updates the power storage amount control data.

The charging facility 2 includes a charging gun 22, a storage device 25, a power supply device 26, and a communication device 27. The charging gun 22 may be inserted into the inlet 120 by a user. The storage device 25 stores information indicating whether the supplied power is classified as green power or non-green power. The power supply device 26 is configured to convert power supplied from the power transmission line 5 and supply power to the vehicle 1. The communication device 27 is configured to communicate with the vehicles 1 by CAN communication while the charging gun 22 is inserted into the inlet 120.

Greenhouse gas emission intensity (hereinafter simply referred to as "emission intensity") is known as an evaluation value for evaluating the amount of greenhouse gas emissions. In the first embodiment, the emission intensity is determined for each of the green power and the non-green power. Green power or non-green power emissions intensity represents the emissions of greenhouse gases per unit of electricity in a given series of processes. For example, for green power, the series of processes includes manufacturing, operating, and managing the photovoltaic power generation facility 42. For non-green power, the series of processes includes the operation and management of thermal power generation facility 44.

Green power and non-green power are classified according to emission intensity. In this example, the emission intensity of the green power is less than the predetermined first reference amount, and the emission intensity of the non-green power is equal to or greater than the first reference amount. Thus, the emission intensity of green power is smaller than that of non-green power. Electricity with lower emission intensity is more environmentally friendly.

Figure 2:
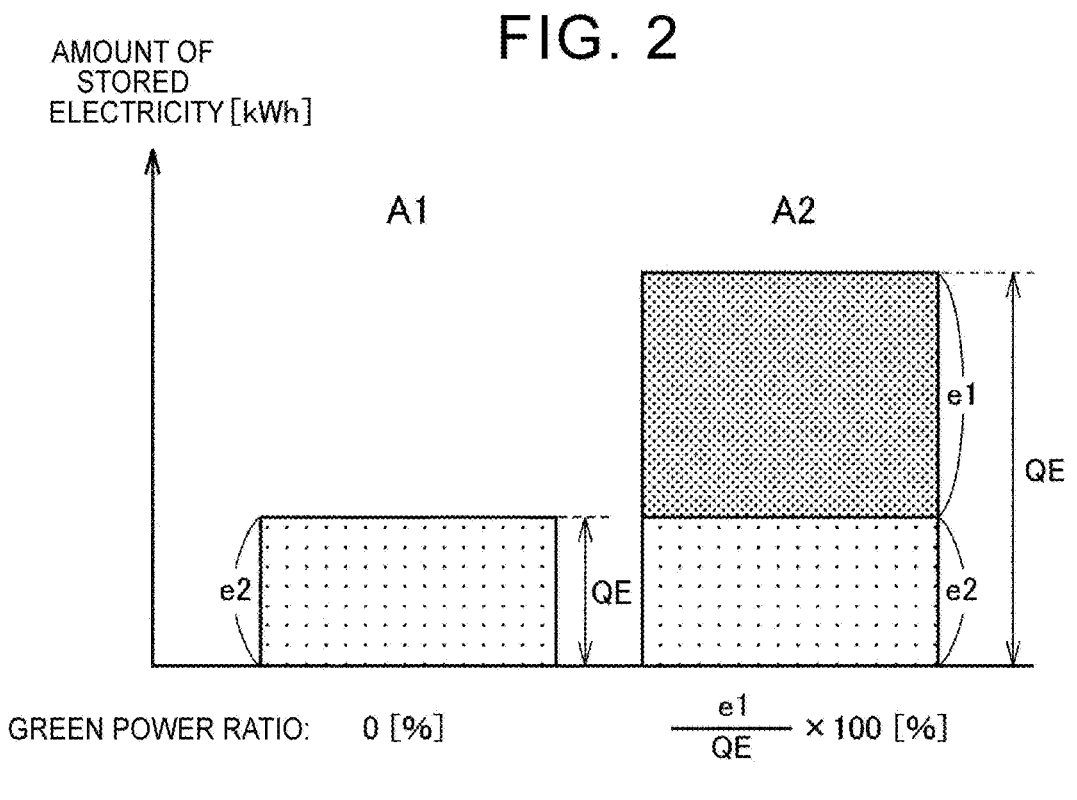
FIG. 2 is a diagram for explaining a breakdown of the total amount of electric storage of a battery.

FIG. 2 is a diagram for explaining a breakdown of the total amount of electricity storage of the battery 105. The breakdown means a ratio of the first electric storage amount (green electric power) and the second electric storage amount (non-green electric power) in the total electric storage amount. Referring to FIG. 2, in the case A1, since the total power storage amount QE includes only the second storage amount e2, the green power ratio is 0%. In the case B2, the total power storage amount QE includes the first power storage amount e1 and the second power storage amount e2, and the green power ratio is (e1/QE) %. In the first embodiment, the green power ratio is used as an exemplary index indicating the degree of the first storage amount e1 in the total power storage amount QE.

In the case A2, when the vehicle 1 is traveling, ECU 190 sequentially rewrites the storage amount control data assuming that the total power storage amount QE is consumed while the green power ratio is maintained. ECU 190 determines the power consumption amount of the battery 105 (the consumption amount of the total power storage amount QE) based on the measured value of the sensor unit 107, and executes the rewriting process according to the determination result.

The generated electric power at the time of regenerative power generation of MG 110 is incorporated into the first electric storage amount e1 or the second electric storage amount e2 in accordance with, for example, the amount of generated electric power and the green electric power ratio (in one embodiment, the amount of generated electric power multiplied by the green electric power ratio is incorporated into the first electric storage amount e1).

From the viewpoint of greenhouse gas reduction, there is a demand for a technique for effectively motivating users to increase the green power ratio in order to promote the use of green power that is friendly to the environment.

The vehicle 1 according to the first embodiment includes a configuration for motivating a user as described above. Specifically, ECU 190 of the vehicle 1 controls MG 110 so that the driving force of the vehicle 1 when the first storage amount e1 in the total power storage amount QE is small is limited more than the driving force when the first storage amount e1 in the total power storage amount QE is large. More specifically, ECU 190 controls MG 110 so as to limit the driving force in a case where the index value (in this example, the green power ratio) indicating the degree of the first storage amount e1 in the total power storage amount QE is lower than the driving force in a case where the index value is higher.

With such a configuration, the driving force of the vehicle 1 is limited more than when the first storage amount e1 in the total power storage amount QE is small (for example, when the green power ratio is low) and when the first storage amount e1 in the total power storage amount QE is large (for example, when the green power ratio is high). Accordingly, the user can be motivated to store more green power in the battery 105 (increase the green power ratio) in order to release the limit of the driving force and improve the comfort. As a result, it is possible to effectively prompt the user to use (charge) the green power.

In addition, according to the above-described configuration, since the driving force is limited when the first storage amount e1 in the total power storage amount QE is small, the battery 105 consumes less power. As a result, it is possible to avoid a situation in which a large amount of power is consumed in the vehicle 1 while the user with low environmental consciousness (the user using the vehicle 1 in a state where the green power ratio is low) is using the vehicle 1. Hereinafter, a specific method for limiting the driving force of the vehicle 1 as described above will be described.

Figure 3:
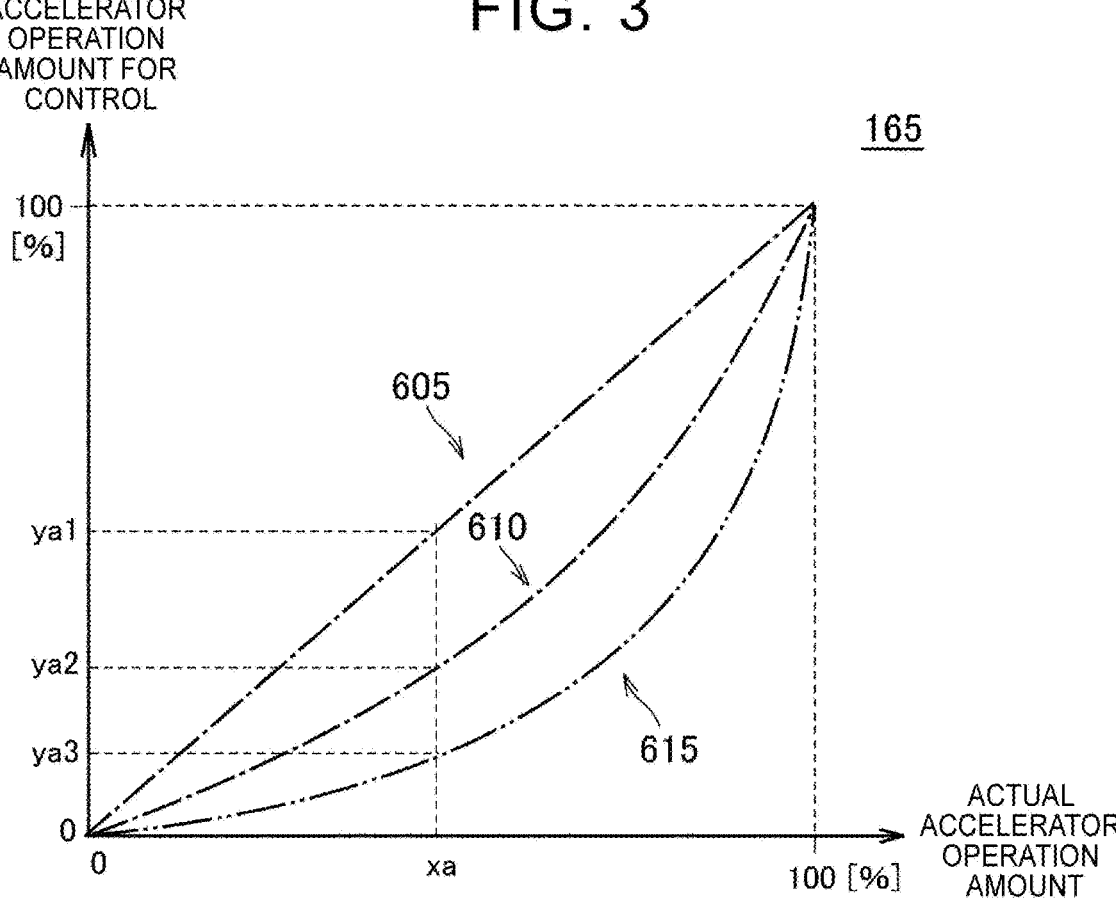
FIG. 3 is a diagram for describing a map used for motor drive control in the first embodiment.

FIG. 3 is a diagram for describing a map used for motor drive control in Embodiment 1. Referring to FIG. 3, the map is stored in the storage device 165. The horizontal axis represents the actual accelerator operation amount, and the vertical axis represents the control accelerator operation amount. The control accelerator operation amount is used to control the driving force of the vehicle 1 and is set based on the actual accelerator operation amount. The larger the control accelerator operation amount, the larger the driving force of the vehicle 1.

Each of the maps 605, 610, 615 corresponds to a characteristic line stored in the storage device 165. Each map represents a relationship between the actual accelerator operation amount and the control accelerator operation amount (the magnitude of the driving force).

For example, the map 605 represents the relationship between the actual accelerator operation amount and the control accelerator operation amount when the green power ratio is equal to or greater than the first threshold value (for example, 90%). The first threshold value corresponds to an example of a "threshold value" of the present disclosure. The map 610 represents the relationship between the actual accelerator operation amount and the control accelerator operation amount when the green power ratio is less than the first threshold value and equal to or greater than the second threshold value (for example, 50%). The map 615 represents the relationship between the actual accelerator operation amount and the control accelerator operation amount when the green power ratio is less than the second threshold.

When the green power ratio is equal to or greater than the first threshold value, ECU 190 performs normal control as motor drive control. The normal control corresponds to controlling MG 110 according to the map 605 and the actual accelerator operation amount (specifically, according to the map 605 and the control accelerator operation amount (for example, ya1 corresponding to xa) determined based on the actual accelerator operation amount). During normal control, the control accelerator operation amount is set to be equal to the actual accelerator operation amount. The normal control is an example of the "first control" of the present disclosure. When the first threshold value is 100%, the normal control is executed only when the green power ratio is 100%.

When the green power ratio is less than the first threshold value and greater than or equal to the second threshold value, ECU 190 executes the first limit control as the motor drive control. This first limit control corresponds to controlling MG 110 according to the map 610 and the actual accelerator operation amount (specifically, according to the map 610 and the control accelerator operation amount (for example, ya2 corresponding to xa) determined based on the actual accelerator operation amount). In the first limit control, since the control accelerator operation amount is set to be smaller than the actual accelerator operation amount, the driving force of the vehicle 1 is limited more than in the normal control. As a result, the power consumption of the battery 105 is reduced.

When the green power ratio is less than the second threshold value, ECU 190 performs the second limit control as the motor drive control. The second limit control corresponds to controlling MG 110 according to the map 615 and the actual accelerator operation amount (specifically, according to the map 615 and the control accelerator operation amount (for example, ya3 corresponding to xa) determined based on the actual accelerator operation amount degree). During the second limit control, the control accelerator operation amount is set to be further smaller than that during the first limit control, so that the driving force of the vehicle 1 is further limited. As a result, the power consumption of the battery 105 is further reduced. The first limit control and the second limit control are also collectively referred to as "drive limit control". The drive limit control is an example of the "second control" of the present disclosure.

For the same actual accelerator operation amount, the control accelerator operation amount (the magnitude of the driving force) of each of the maps 610,615 is smaller than the control accelerator operation amount (the magnitude of the driving force) of the map 605, and the control accelerator operation amount of the map 615 is smaller than the control accelerator operation amount of the map 610 (for example, ya3<ya2<ya1). This is related to limiting the driving force if the green power ratio is less than the first threshold and further limiting the driving force if the ratio is less than the second threshold. In other words, if the ratio is less than the first threshold, the power consumption of the battery 105 is reduced, and if the ratio is less than the second threshold, the power consumption is further reduced.

ECU 190 may control at least one of the car navigation device 145, the instrument panel 150, or the display lamp 155 to notify the user of the fact during the execution of the drive limit control. For example, ECU 190 displays, on the display of the car navigation device 145 or the instrument panel 150, a display for notifying the user that the drive limit control is being executed. ECU 190 may change the illumination of the instrument panel 150 during execution of the drive limit control as compared to during execution of the normal control. In one embodiment, ECU 190 controls the illumination of the instrument panel 150 to green during execution of the normal control, while controlling the illumination to blue and gray during execution of the first limiting control and the second limiting control, respectively. ECU 190 may change the lighting color of the display lamp 155 as compared with the execution of the normal control during the execution of the drive limit control. In one embodiment, ECU 190 causes the display lamp 155 to light green during execution of the normal control, while causing the display lamp 155 to light blue and gray during execution of the first limit control and the second limit control, respectively.

By controlling the display lamp 155 and the like as described above, the user is notified of the fact during execution of the drive restriction control. As a result, the user can reliably recognize that the driving force is limited. This allows the user to be more effectively motivated to utilize more green power (stored in battery 105).

FIG. 4 is a flow chart exemplifying a process executed by ECU 190 in the first embodiment. This flowchart is executed when the accelerator pedal 115 is operated.

Referring to FIG. 4, ECU 190 determines whether the green power ratio is equal to or greater than a second threshold (S110). In this example, the second threshold is 50%.

If the green power ratio is greater than or equal to 50% (YES in S110), ECU 190 determines whether the green power ratio is greater than or equal to the first threshold (S115). In this instance, the first threshold is 100% and ECU 190 determines whether the green power ratio is 100%.

When the green power ratio is 100% (YES in S115), ECU 190 executes normal control and displays the fact on the instrument panel 150 (S120). ECU 190 may also cause the display lamp 155 to turn green.

When the green power ratio is less than 100% and 50% or more (NO in S115), ECU 190 executes the first limit control and displays the fact on the instrument panel 150 (S125). ECU 190 may further turn on the display lamp 155 in blue.

When the green power ratio is less than 50% (NO in S110), ECU 190 executes the second limit control and displays the second limit control on the instrument panel 150 (S130). ECU 190 may also turn on the display lamp 155 in gray. After S120, S125, S130, the process transitions to returns.

As described above, according to the first embodiment, the driving force of the vehicle 1 is limited when the green power ratio is low. Accordingly, the user can be motivated to increase the green power ratio in order to release the limit of the driving force and improve the comfort. As a result, it is possible to effectively urge the user to use the green power.

Second Embodiment

Figures 5A, 5B:
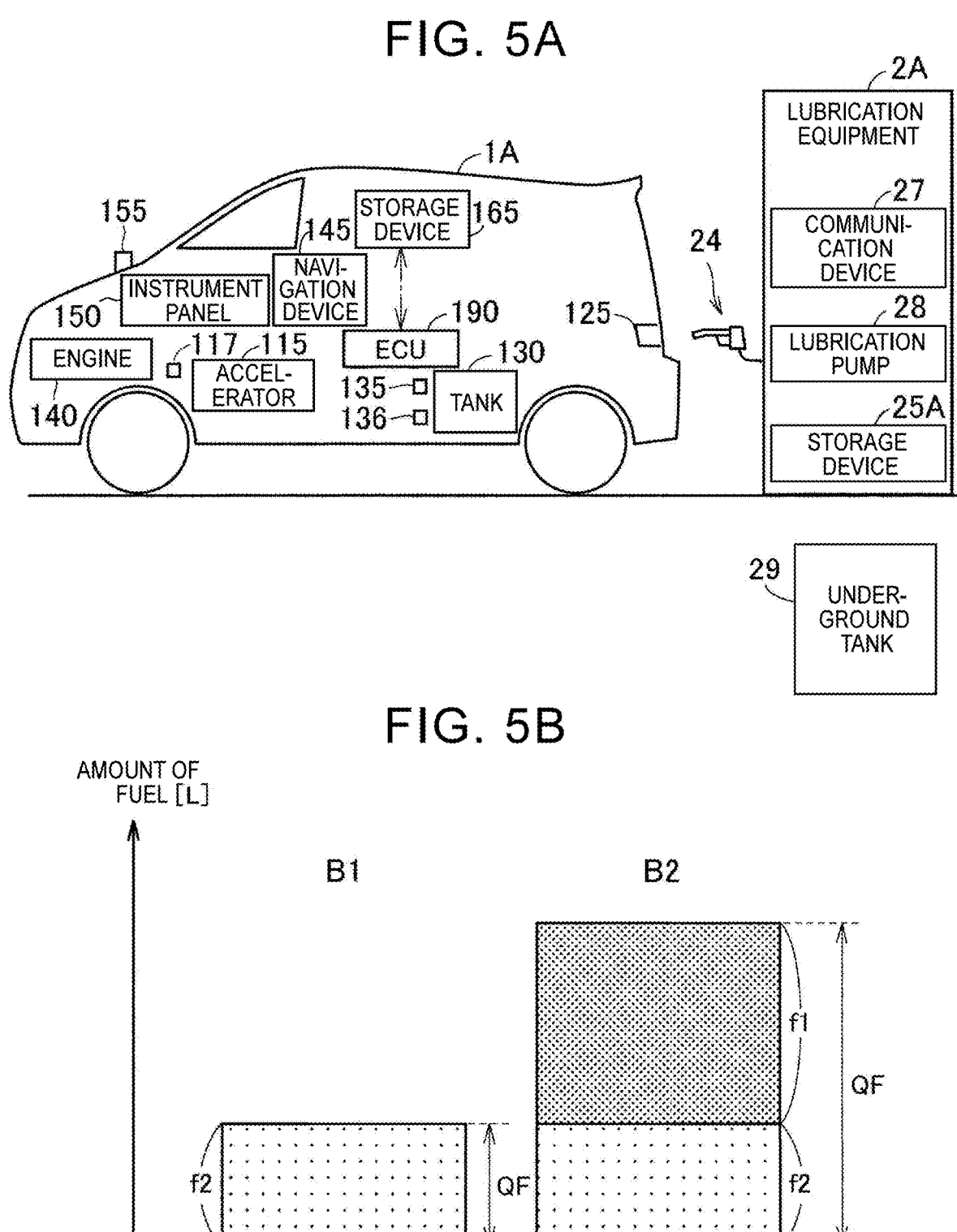
FIG. 5A is a diagram for describing a vehicle according to a second embodiment.
FIG. 5B is a diagram for describing a vehicle according to a second embodiment.

FIG. 5A and FIG. 5B are diagrams for describing a vehicle according to a second embodiment of the present disclosure. Referring to FIG. 5A, the vehicle 1A differs from the vehicle 1 (BEV) of the first embodiment in that it is an engine-driven vehicle. The refueling facility 2A differs from the charging facility 2 of the first embodiment in that fuel stored in an underground tank 29 provided underground is supplied to the vehicle 1A. The fuel in the underground tank 29 is classified as either green fuel or non-green fuel (both described below).

The vehicle 1A differs from the vehicle 1 in that it includes a refueling port 125, a tank 130, a concentration sensor 135, a remaining amount sensor 136, and an engine 140 in place of the battery 105, PCU 108, MG 110, and the inlet 120. In other respects, since the vehicle 1A is basically the same as that of the vehicle 1, the detailed explanation will not be repeated.

The refueling port 125 receives fuel supplied from the refueling facility 2A when the refueling gun 24 (described later) of the refueling facility 2A is inserted and the vehicle 1A is connected to the refueling facility 2A.

The tank 130 stores the fuel supplied from the refueling facility 2A through the refueling port 125. The fuel in the tank 130 is used as an energy source for the vehicle 1A. The tank 130 corresponds to an example of an "energy source storage device" of the present disclosure.

The fuel in the tank 130 contains at least one of green fuel and fuel different from green fuel (hereinafter, also referred to as "non-green fuel"). Green fuels represent fuels derived from renewable resources and are biomass fuels in this example. Non-green fuels correspond to fuels that are not derived from renewable resources, and in this example are fossil derived fuels such as gasoline. The fuel in the tank 130 is a mixed fuel in which both green fuel and non-green fuel are contained.

The amount (remaining amount) of fuel in the tank 130 is also referred to as "total fuel amount". Among the total fuel amounts, the amount of green fuel is also referred to as the "first fuel amount", and the amount of non-green fuel is also referred to as the "second fuel amount". The sum of the first fuel amount and the second fuel amount corresponds to the total fuel amount. The ratio of the first fuel amount to the total fuel amount is also referred to as the "green fuel ratio".

The concentration sensor 135 measures the alcohol concentration of the fuel in the tank 130. This alcohol concentration is higher as the green fuel (biomass fuel) in the tank 130 is larger, that is, the green fuel ratio is higher. The remaining amount sensor 136 measures the remaining amount of fuel (total fuel amount) in the tank 130. The engine 140 generates the driving force of the vehicle 1A by consuming the fuel in the tank 130. The smaller the driving force, the lower the fuel consumption in the tank 130. The driving force corresponds to the power of the engine 140 determined based on the torque and the rotational speed of the engine 140. The engine 140 corresponds to an example of a "drive device" of the present disclosure, and is controlled by an ECU 190.

The storage device 165 includes fuel quantity management data for managing the quantity of fuel in the tank 130. The data further includes information indicating the total fuel amount, information indicating the first fuel amount, information indicating the second fuel amount, and information indicating the green fuel ratio.

ECU 190 controls various devices of the vehicle 1A according to the map stored in the storage device 165 and the measured values of various sensors such as the opening degree sensor 117 and the concentration sensor 135. The device includes an engine 140, a car navigation device 145, an instrument panel 150, and a display lamp 155. Driving and controlling the engine 140 is also referred to as "executing engine drive control." ECU 190 executes engine-drive control in accordance with the control accelerator operation amount and the vehicle speed of the vehicle 1A.

While the vehicle 1A is connected to the refueling facility 2A, ECU 190 is configured to communicate with the refueling facility 2A by, for example, CAN communication. During refueling from the refueling facility 2A to the vehicle 1A, ECU 190 receives from the refueling facility 2A information indicating the quantity of fuel to be refueled and whether the fuel is classified as green fuel or non-green fuel. In this way, ECU 190 updates the fuel-amount-management-data. ECU 190 may use the map to calculate (estimate) the green fuel ratio according to the measured value of the concentration sensor 135, thereby updating the fuel quantity control data. This map is determined by a preliminary evaluation test or the like as a relationship between the measured value of the concentration sensor 135 and the green fuel ratio, and is stored in the storage device 165.

The refueling facility 2A differs from the charging facility 2 (shown in FIG. 1B) in that it includes a refueling gun 24, a storage device 25A, and a refueling pump 28 in place of the charging gun 22, the storage device 25, and the power supply device 26. The refueling gun 24 may be inserted into the refueling port 125 by a user. The storage device 25A stores information indicating whether the fuel of the underground tank 29 is classified as green fuel or non-green fuel. The refueling pump 28 is configured to supply fuel in the underground tank 29 to the vehicle 1A while the refueling gun 24 is inserted into the refueling port 125.

In the second embodiment, the emission intensity is determined for each of the green fuel and the non-green fuel. Emission intensity for green or non-green fuels shall correspond to the emissions of greenhouse gases in a given series of processes per unit. For example, for each of green and non-green fuels, the series of processes involves the operation and management of the fuel's manufacturing equipment.

Each of green fuel and non-green fuel is classified according to emission intensity. For example, the emission intensity of the green fuel is less than the predetermined second reference amount, and the emission intensity of the non-green fuel is equal to or greater than the predetermined second reference amount. Thus, the emission intensity of green fuel is smaller than that of non-green fuel. Fuels with smaller emission intensity are more environmentally friendly.

Referring to FIG. 5B, the total fuel content of the tank 130 will be described. The breakdown means the ratio of the first fuel amount (green fuel) and the second fuel amount (non-green fuel) in the total fuel amount. In the case B1, since the total fuel amount QF consists only of the second fuel amount f2, the green fuel ratio is 0%. In the case B2, the total fuel amount QF is composed of the first fuel amount f1 and the second fuel amount f2, and the green fuel ratio is (f1/QF) %. In the second embodiment, the green fuel ratio is used as an exemplary index indicating the amount of the first fuel amount f1 in the total fuel amount QF.

From the viewpoint of reduction of greenhouse gases, there is also a need for a technique for effectively motivating users to increase the green fuel ratio in order to promote the use of green fuel.

The vehicle 1A according to the second embodiment includes a configuration for motivating a user as described above. Specifically, ECU 190 of the vehicle 1A controls the engine 140 so as to limit the driving force of the vehicle 1 when the first fuel amount f1 in the total fuel amount QF is small, rather than the driving force when the first fuel amount f1 in the total fuel amount QF is large. More specifically, ECU 190 controls the engine 140 to limit the driving force in a case where the index value (in this example, the green fuel ratio) indicating the quantity of the first fuel quantity f1 in the total fuel amount QF is lower than the driving force in a case where the index value is higher.

With such a configuration, when the first fuel amount f1 in the total fuel amount QF is small (for example, when the green fuel ratio is low), the driving force of the vehicle 1 is limited more than when the first fuel amount f1 in the total fuel amount QF is large (for example, when the green fuel ratio is high). This may motivate the user to store more green fuel in the tank 130 (increase the green fuel ratio) to release the drive force limit and improve comfort. As a result, it is possible to effectively urge the user to use (refuel) the green fuel.

In addition, according to the above-described configuration, when the first fuel amount f1 in the total fuel amount QF is small, the driving force is limited, so that the fuel in the tank 130 is consumed less. As a consequence, it is possible to avoid a situation in which a large amount of fuel is consumed in the vehicle 1A while a user who is less environmentally conscious (a user who uses the vehicle 1A with a low green fuel ratio) is using the vehicle 1A.

ECU 190 controls the engine 140 to limit the driving force of the vehicle 1 using the map in the same manner as in the first embodiment. This point will be described below.

Referring again to FIG. 3, in the second embodiment, the map 605 represents the relationship between the actual accelerator operation amount and the control accelerator operation amount (the magnitude of the driving force) when the green fuel ratio is equal to or greater than the first threshold value (for example, 90%). The map 610 represents the relationship between the actual accelerator operation amount and the control accelerator operation amount when the green fuel ratio is less than the first threshold value and equal to or greater than the second threshold value (for example, 50%). The map 615 represents the relationship between the actual accelerator operation amount and the control accelerator operation amount when the green fuel ratio is less than the second threshold.

When the green fuel ratio is equal to or greater than the first threshold value, ECU 190 performs the normal control as the engine-drive control. This normal control corresponds to the control of the engine 140 according to the map 605 and the actual accelerator operation amount, and is an example of the "first control" of the present disclosure. When the green fuel ratio is less than the first threshold value and greater than or equal to the second threshold value, ECU 190 executes the first limit control as the engine drive control. The first limit control corresponds to controlling the engine 140 according to the map 610 and the actual accelerator operation amount. When the green fuel ratio is less than the second threshold value, ECU 190 performs the second limit control as the engine-driven control. The second limit control corresponds to controlling the engine 140 according to the map 615 and the actual accelerator operation amount. Each of the first limit control and the second limit control (drive limit control) is an example of the "second control" of the present disclosure.

ECU 190 may control at least one of the car navigation device 145, the instrument panel 150, or the display lamp 155 to notify the user when the green fuel ratio is less than the first threshold value, that is, when the drive limit control is executed. Since these control methods are the same as those described in the first embodiment, detailed description will not be repeated, but by controlling the display lamp 155 and the like as described above, the user can be motivated more effectively to use more green fuel (to be stored in the tank 130).

Figure 6:
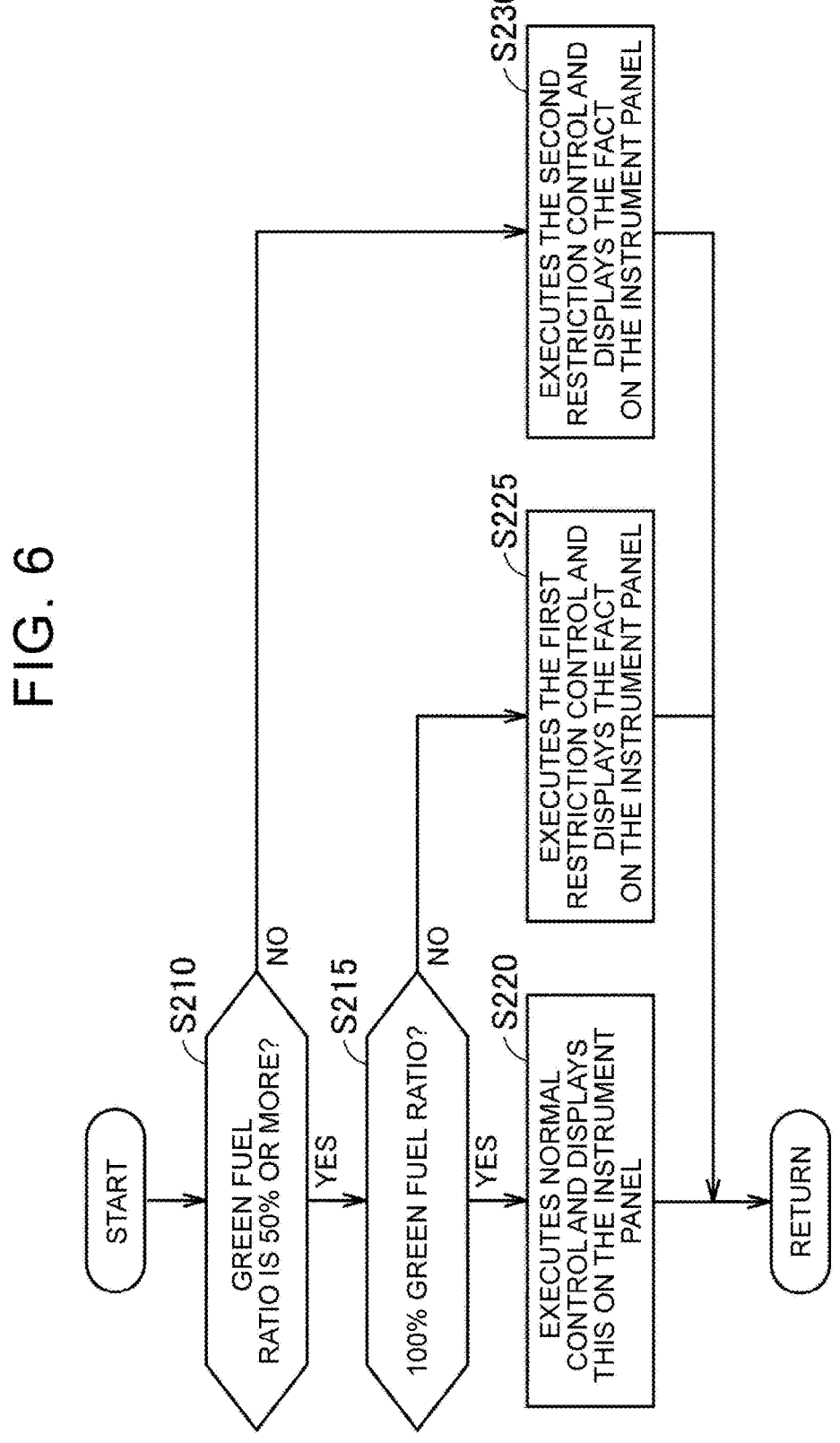
FIG. 6 is a flow chart exemplifying a process executed by ECU in the second embodiment.

FIG. 6 is a flow chart exemplifying a process executed by ECU 190 in the second embodiment. Referring to FIG. 6, this flowchart differs from the flowchart of Embodiment 1 (FIG. 4) in that S210, S215 is executed instead of S110, S115. Since S220, S225, S230 are the same as those of S120, S125, S130, the detailed explanation will not be repeated.

Referring to FIG. 6, ECU 190 determines whether the green fuel ratio is equal to or greater than a second threshold (S210). In this example, the second threshold is 50%.

If the green fuel ratio is greater than or equal to 50% (YES in S210), ECU 190 determines whether the green fuel ratio is greater than or equal to the first threshold (S215). In this instance, the first threshold is 100% and ECU 190 determines whether the green-fuel ratio is 100%.

If the green fuel ratio is 100% (YES in S215), the process proceeds to S220. If the green fuel ratio is less than 100% and greater than or equal to 50% (NO in S215), the process proceeds to S225. If the green fuel ratio is less than 50% (NO in S210), the process proceeds to S230.

As described above, according to the second embodiment, the driving force of the vehicle 1 is limited when the green fuel ratio is low. Accordingly, the user can be motivated to increase the green fuel ratio in order to release the limitation of the driving force and improve the comfort. As a result, it is possible to effectively urge the user to use the green fuel.

Modification of Embodiment 1, 2

In Embodiments 1 and 2, ECU 190 is to limit the driving force stepwise based on the magnitude relation between the index value and the first threshold value (or the second threshold value), the driving force may be continuously limited according to the index value (specifically, the driving force may be reduced as the index value decreases).

In the first embodiment, the green power ratio is used as the index value indicating the degree of the first storage amount e1 in the total power storage amount QE, but the green power ratio is not limited thereto, and may be, for example, a difference (e1−e2) between the first storage amount e1 and the second storage amount e2. Similarly, in the second embodiment, the green fuel ratio is used as the index value indicating the degree of the first fuel amount f1 in the total fuel amount QF, but the present disclosure is not limited thereto, and may be, for example, a difference (f1−f2) between the first fuel amount f1 and the second fuel amount f2.

The vehicle 1 (1A) may be replaced by a vehicle running with at least one of electric power and fuel as an energy source, such as a plug-in hybrid electric vehicle (PHEV).

The green power may be generated power of another natural generation method such as wind power generation or hydroelectric power generation instead of the generated power of solar power generation. Similarly, the green fuel may be a decarbonized fuel, such as e-fuel, instead of a biomass fuel.

It should be considered that the embodiments disclosed above are for illustrative purposes only and are not limitative of the disclosure in any aspect. It is intended that the scope of the disclosure be defined by the appended claims rather than the foregoing description, and that all changes within the meaning and range of equivalency of the claims be embraced therein.

What is claimed is:

1. A vehicle comprising:
an energy source storage device that stores an energy source of the vehicle;
a drive device that generates a driving force of the vehicle by consuming the energy source; and
a control device that controls the drive device, wherein:
the energy source includes a first energy source that is a renewable energy source and a second energy source that is a non-renewable energy source, each of the first energy source and the second energy source being classified in accordance with an emission intensity of a greenhouse gas;
the emission intensity of the first energy source is smaller than the emission intensity of the second energy source; and
the control device controls the drive device such that the driving force when an amount of energy of the first energy source as a percentage of a total amount of energy of the energy source is smaller, is more limited when compared to the driving force when the amount of energy of the first energy source as a percentage of the total amount of energy of the energy source is larger;
the vehicle further comprising:
an accelerator pedal of which an operation amount is adjusted according to a user operation; and
a storage device that stores a first characteristic and a second characteristic, wherein:
the first characteristic represents a relationship between a magnitude of the driving force and the operation amount when an index value indicating the amount of energy of the first energy source as a percentage of the total amount of energy of the energy source is equal to or greater than a threshold value;
the second characteristic represents a relationship between the magnitude of the driving force and the operation amount when the index value is less than the threshold value;
for the same operation amount, the driving force of the second characteristic is smaller than the driving force of the first characteristic; and
the control device executes
first control in which the drive device is controlled in accordance with the first characteristic and the operation amount, when the index value is equal to or greater than the threshold value, and
second control in which the drive device is controlled in accordance with the second characteristic and the operation amount, when the index value is less than the threshold value.

2. The vehicle according to claim 1, wherein:
the energy source storage device includes a power storage device that stores electric power as the energy source; and
the drive device includes a motor that generates the driving force by consuming the electric power.

3. The vehicle according to claim 1, wherein:

the energy source storage device includes a fuel tank that stores fuel as the energy source; and the drive device includes an engine that generates the driving force by consuming the fuel.

4. The vehicle according to claim 1, further comprising a notification device that notifies, during execution of the second control, a user of the vehicle of the execution of the second control.

* * * * *